United States Patent [19]
Yajima et al.

[11] 4,361,679
[45] Nov. 30, 1982

[54] PROCESS FOR PRODUCING HEAT-RESISTANT AND MOISTURE-RESISTANT POLYBOROMETALLOSILOXANES

[75] Inventors: Seishi Yajima, Tohokudaigaku shukusha 4-2, 843, Ohnukimachi, Oharai-machi, Higashiibaraki-gun, Ibaraki-ken, Japan; Kiyohito Okamura; Toetsu Shishido, both of Oharai, Japan

[73] Assignees: NTN Toyo Bearing Co., Ltd., Osaka; Seishi Yajima, Ibaraki, both of Japan

[21] Appl. No.: 278,929

[22] Filed: Jun. 30, 1981

[51] Int. Cl.$^3$ .................... C08G 77/04; C08G 77/56
[52] U.S. Cl. ........................ 525/389; 528/5; 528/25; 260/429 R
[58] Field of Search ............... 260/429 R; 525/389 528/5; 25

[56] References Cited

U.S. PATENT DOCUMENTS

| | | | |
|---|---|---|---|
| 2,463,974 | 3/1949 | Johannson | 528/25 X |
| 2,994,711 | 8/1961 | Cohen | 260/429 R |
| 3,086,983 | 4/1963 | Cohen | 260/429 R |
| 3,377,312 | 4/1968 | Baney | 525/389 X |
| 4,070,343 | 1/1978 | Kishimoto et al. | 528/25 |
| 4,152,509 | 5/1979 | Yajima et al. | 528/25 X |
| 4,242,487 | 12/1980 | Yajima et al. | 528/5 X |
| 4,334,051 | 6/1982 | Yajima et al. | 528/25 |

Primary Examiner—Helen M. S. Sneed
Attorney, Agent, or Firm—Ladas & Parry

[57] ABSTRACT

A process for producing a heat-resistant and moisture-resistant polyborometallosiloxane, which comprises adding a metal compound and a compound capable of easily forming a complex with the metal compound to an organoborosiloxane, the metal in said metal compound being at least one member of the group consisting of Ti, Zr, V, P, Al, Fe, Cr, Co, Ni, Ge, Sn, As, Mg, Pb and Sb; and heating the resulting mixture to a temperature of 550° C. or lower to bond the metal atom to the silicon atom and/or the boron atom through an oxygen atom.

4 Claims, No Drawings

PROCESS FOR PRODUCING HEAT-RESISTANT AND MOISTURE-RESISTANT POLYBOROMETALLOSILOXANES

BACKGROUND OF THE INVENTION

This invention relates to a process for producing a heat-resistant and moisture-resistant polyborometallosiloxane.

Polyimide is known to be a polymer having excellent heat resistance which does not easily melt or decompose at high temperatures. It can be prepared, for example, by poly-addition reaction of pyromellitic dianhydride and 4,4′-diaminodiphenyl ether to form a polyamide acid prepolymer, and heating the prepolymer to 250° C. to dehydrocyclize it. A polyimide film is used mainly as a heat-resistant insulating material because it does not decompose even when heated in the air to a temperature near 225° C. The advent of heat-resistant polymers which are stable at higher temperatures is strongly desired in the field of high temperature technology. The present invention can provide a polymer which meets this requirement.

SUMMARY OF THE INVENTION

According to this invention, there is provided a process for producing a heat-resistant and moisture-resistant polyborometallosiloxane, which comprises adding a metal compound and a compound capable of easily forming a complex with the metal compound to an organoborosiloxane, the metal in said metal compound being at least one member of the group consisting of Ti, Zr, V, P, Al, Fe, Cr, Co, Ni, Ge, Sn, As, Mg, Pb and Sb; and heating the resulting mixture to a temperature of not more than 550° C. to bond the metal atom to the silicon atom and/or the boron atom through an oxygen atom.

This process of the invention can improve the inherent hygroscopicity of the organoborosiloxane.

DETAILED DESCRIPTION OF THE INVENTION

The starting materials used for the production of the heat-resistant and moisture-resistant polyborometallosiloxane in the process of this invention are the organoborosiloxane, the metal compound and the compound capable of forming a complex with the metal compound.

The organoborosiloxane as a first material is a monomer, oligomer or polymer whose main chain consists mainly of B, Si and O elements.

The present applicants previously found that a polyorganoborosiloxane having at least one phenyl group bonded to the silicon atom had much higher heat resistance than organoborosiloxane compounds which had been known before, and disclosed the phenyl-containing polyorganoborosiloxane and a process for its production in U.S. Pat. No. 4,152,509 to Yajima et al. This U.S. patent discloses a compound having the following structural formula. This compound can be used suitably as the starting organoborosiloxane in the present invention.

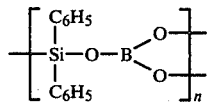

(wherein the end groups are phenyl or hydroxyl groups).

The present applicants previously developed modified polyborosiloxanes having high heat resistance and being easily soluble in solvents by the reaction of organoborosiloxane compounds with specified organic compounds, i.e. aliphatic polyhydric alcohols, aromatic alcohols, phenols or aromatic carboxylic acids, and disclosed a process for production thereof in U.S. Pat. No. 4,242,487 to Yajima et al. The modified polyborosiloxanes disclosed in this U.S. patent can also be suitably used as the first starting material in this invention. The first material in this invention, however, is not limited to these specific compounds, and other known polyorganosiloxanes can be used.

The metal compound as a second material is a compound of at least one element selected from the group consisting of Ti, Zr, V, P, Al, Fe, Cr, Co, Ni, Ge, Sn, As, Mg, Pb, and Sb.

Examples of the metal compound are halides, oxyhalides, sulfates, oxysulfates, oxalates and oxyoxalates of the aforesaid metals, alkali metal salts and ammonium salts of the aforesaid salts, and acetylacetone complexes of these metals. When the metal is vanadium, there can be used such vanadium compounds as $VCl_4$, $V_2(SO_4)_3$, $VOBr_2$, $Na(VOCl_4)$, $(NH_4)V(SO_4)_2$, $K[VO(C_2O_4)_2]$, and $[V(C_5H_7O_2)_3]$.

The compound capable of forming a complex salt, a third material, is a compound which easily forms a complex with the above metal compound. Examples of such a complex-forming compound include ethers, monohydric and polyhydric alcohols, ketones, phenols, heterocyclic compounds containing oxygen as a hetero atom, and chain and cyclic compounds having quinonic oxygen, an aldehyde group, or a carboxyl group in the side chain. For example, $C_2H_5OC_2H_5$, $(CH_2OH)_2$, $CH_3COCH_3$, $C_6H_5OH$, $C_4H_8O$ (tetrahydrofuran), $C_5H_4O_2$ (pyrrone), $C_7H_6$ (benzaldehyde), $C_7H_6O_2$ (benzoic acid), $C_7H_8O$ (benzyl alcohol, $C_5H_8O_2$ (acetylacetone), and ethylenediamine tetraacetate (EDTA) are suitable for use as the complex-forming compound in this invention.

According to this invention, the three materials, i.e. the organoborosiloxane, the metal compound and the complex-forming compound, are mixed sumultaneously, and the resulting mixture is heated to a temperature of not more than 550° C. to synthesize the desired polyborometallosiloxane. When the metal compound is in the form of a complex salt, for example an acetylacetone complex, it is not always necessary to add the third material.

In the process of this invention, the heating may be carried out in an atmosphere of an inert gas or an oxidizing gas. $N_2$ and Ar are specific examples of the inert gas used. Suitable oxidizing gases are, for example, gaseous mixtures of nitrogen and oxygen having a lower partial pressure of oxygen than air, such as a mixture of $N_2$ and $O_2$ in a mole ratio of 10:1. The heating temperature is not more than 550° C., preferably 200° to 500° C. The following modes can be employed in this invention in performing the heating.

(1) The starting mixture is heated while it is being stirred. The heating is stopped at a relatively low temperature. The mixture is molded, and then heated at a high temperature.

(2) The starting mixture is cold-molded, and then heated.

The structure of the product obtained after heating in the process of this invention has not yet been completely elucidated. For example, a product obtained by mixing borodiphenylsiloxane having a number average molecular weight of about 400 (which is prepared by refluxing 310 g of boric acid and 1898 g of diphenyldichlorosilane in n-butyl ether at 180° C. for 20 hours) as the first material, vanadium tetrachloride (liquid) as the second material, and tetrahydrofuran as the third material and heating the mixture to 400° C. has been found to take the following various forms, as determined by infrared absorption spectroscopy, etc., in the bonding of the vanadium atom to at least one silicon atom and/or at least one boron atom through an oxygen atom. The vanadium atom can have a maximum atomic valence of 5, but in these cases, it is bonded in a trivalent or tetravalent form.

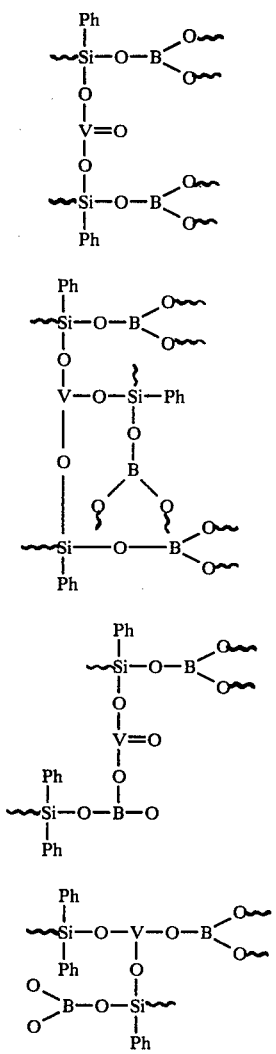

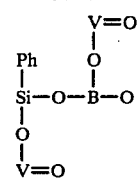

The forms (1) to (3) show that the main chains of the organoborosiloxane are crosslinked by the V-O linkage; the form (4) shows that the V-O linkage is incorporated in the main chain of the organoborosiloxane; and the form (5) shows that the V-O linkage exists as a side-chain pendant to the main chain of the organoborosiloxane. When the end groups of the organoborosiloxane are of the diol type, the incorporation of the V-O linkage in the main chain of the organoborosiloxane is liable to take place, and this also readily occurs when the polyborosiloxane is severed by thermal vibration during the heating. In these forms (1) to (5), two or more V-O linkages could occur connected directly to each other.

In the process of this invention, the metal atom of the metal compound is bonded to at least one silicon atom of the organoborosiloxane and/or at least one boron atom thereof through an oxygen atom. The M-O linkage (in which M represents a metal atom) is introduced as a crosslink between the main chains of the organoborosiloxane, or incorporated in the main chain of the organoborosiloxane as a linkage unit constituting the main chain of the polymer, or sometimes, introduced as a side-chain pendant to the main chain of the organoborosiloxane. In this way, the polyborometallosiloxane intended in the process of this invention is formed. The polyborometallosiloxane obtained by the process of this invention is a substance which has higher heat resistance than polyborosiloxane and also has improved moisture resistance.

In practising the process of this invention, the ratio of the amount of the organoborosiloxane to that of the metal compound is preferably 2:1 to 200:1 in terms of the atomic ratio of the Si atoms and B atoms combined of the organoborosiloxane to the metal atoms (M) in the metal compound. If this atomic ratio is large (i.e., if the amount of the metal compound is relatively small), the resulting polyborometallosiloxane exhibits rubbery elasticity. On the other hand, if this atomic ratio is small (i.e., if the amount of the metal compound is relatively large), the resulting polyborometallosiloxane shows resin-like properties.

The amount of the complex-forming compound used as the third material is the one at least required to form a complex with the metal compound. Preferably, it is used in an amount far in excess of this required amount, because the complex-forming compound as the third material usually functions as a reaction medium in addition to serving to form a complex with the metal compound. Accordingly, the use of a large excess of the complex-forming compound is advantageous in carrying out the reaction smoothly.

In performing the process of this invention, it is effective to use an organic peroxide such as benzoyl peroxide or dicumyl peroxide for promotion of the crosslinking of M-O linkages, or to use a filler such as $SiO_2$ or ZnO together for reinforcing effects.

The polyborometallosiloxane obtained by the present invention is fire-retardant, and does not undergo drastic deterioration even when heated at 250° to 450° C. in the air. In has a brittle temperature of −60° C. or lower and exhibits superior cold resistance. The polyborometallosiloxane can be used in applications utilizing rubbery elasticity when it has a small number of ─(M─O)─ linkages, and in resin applications when it has a large number of ─(M─O)─ linkages. Specifically, it finds extensive use as seals, gaskets, diaphragms, hoses, foams, coatings, antivibratory materials, electrical component parts, etc. in various fields such as space, aircraft and automotive applications. It is also useful as a heat-resistant structural materials such as a matrix of fiber-reinforced plastics (FRP), or a matrix for heat-resistant plastic magnets.

The following Examples illustrate the present invention more specifically.

EXAMPLE 1

Boric acid (310 g), 1898 g of diphenyldichlorosilane and 3 liters of n-butyl ether were put in a 5-liter three-necked flask, and were stirred at 100° C. for 18 hours. The reaction mixture was cooled to give a white precipitate. The n-butyl ether was removed, and the precipitate was washed with methanol to remove the unreacted boric acid. The residue was washed with water to give 1680 g of borodiphenylsiloxane compound having a number average molecular weight of about 400 as a starting material in the process of the present invention.

The above compound (20 g), 0.5 g of vanadium tetrachloride and 100 cc of tetrahydrofuran were mixed and then put in a flask. While passing $N_2$ gas through the flask, the mixture was stirred at 100° C. for 5 hours to give a yellowish brown precipitate. The excess of tetrahydrofuran was removed, and the precipitate was cold-molded at 2 tons/cm$^2$. The molded product was maintained in a stream of a gaseous mixture of $N_2$ and $O_2$ (10:1) at 400° C. for 2 hours to give resinous polyborovanadosiloxane. When heated to 300° C. in the air, this product was not drastically degraded. It also had excellent moisture resistance.

EXAMPLE 2

Thirty grams of the same borodiphenylsiloxane as used in Example 1, 1 g of $V_2(SO_4)_3$ and 50 cc of acetylacetone were mixed, and heated by the same operation as in Example 1. Resinous polyborovanadosiloxane having similar heat resistance and moisture resistance to the product of Example 1 was obtained.

EXAMPLE 3

Two hundred grams of the same borodiphenylsiloxane as used in Example 1 was intimately mixed with 20 g of hydroquinone, and in a 500 ml flask, the mixture was heated with stirring in a nitrogen atmosphere by raising the temperature at a raising rate of 50° C. per hour. The reaction was carried out at 300° C. for 1 hour to give a modified borodiphenylsiloxane compound as a light yellow resinous substance.

Twenty grams of the resulting compound, 0.3 g of vanadium tetrachloride and 100 cc of tetrahydrofuran were mixed, and the mixture was maintained in a stream of a gaseous mixture consisting of $N_2$ and $O_2$ (10:1) at 200° C. for 0.5 hour. The resulting resinous compound was finely pulverized, put in a mold, and maintained at 420° C. for 10 minutes to give a molded article of polyborovanadosiloxane. When heated to 320° C. in the air, this molded article is not drastically degraded. It also had excellent moisture resistance.

EXAMPLE 4

Twenty grams of the same borodiphenylsiloxane compound as used in Example 1, 20 g of the same modified borodiphenylsiloxane compound as used in Example 4, 1 g of vanadium tetrachloride and 100 cc of tetrahydrofuran were mixed, and the mixture was heated by the same operation as in Example 1. There was obtained resinous polyvanadoborosiloxane which remained stable even when heated to 320° C. in the air. It had excellent moisture resistance.

EXAMPLE 5

By repeating each of Examples 1 to 4 except that the vanadium in the metal compound was replaced by Ti, Zr, P, Al, Fe, Cr, Co, Ni, Ge, Sn, As, Mg, Pb or Sb, polyborometallosiloxanes corresponding to the respective metal atoms were produced. Excellent results were obtained with Ti, Zr, Al, Cr, Ge and Sn. In the case of P, Fe, Co, Ni, As, Mg, Pb and Sb, the products had slightly inferior heat resistance but were still useful.

What we claim is:

1. A process for producing a heat-resistant and moisture-resistant polyborometallosiloxane, which comprises adding
   (1) a phosphorus or metal compound which compound is selected from the group consisting of salts which are halides, oxyhalides, sulfates, oxysulfates, oxalates and oxyoxalates; alkali metal and ammonium salts of said salts; and acetylacetone complexes; and
   (2) a compound capable of easily forming a complex with the phosphorus or metal compound, said compound capable of easily forming a complex being selected from the group consisting of ethers, monohydric and polyhydric alcohols, ketones, phenols, heterocyclic compounds containing oxygen as a hetero atom, and chain and cyclic compounds having quinonic oxygen, an aldehyde group, or a carboxyl group in the side chain; to
   (3) an organoborosiloxane, being a monomer, oligomer or polymer whose main chain consists mainly of B, Si and O elements;
the metal in said metal compound being at least one member selected from the group consisting of Ti, Zr, V, Al, Fe, Cr, Co, Ni, Ge, Sn, As, Mg, Pb and Sb; and heating the resulting mixture to a temperature of 550° C. or lower to bond the phosphorus or metal atom to the silicon atom and/or the boron atom through an oxygen atom.

2. The process of claim 1 wherein the ratio of the amount of the organoborosiloxane to that of the phosphorus or metal compound is from 2:1 to 200:1 in terms of the atomic ratio of the Si atoms and B atoms combined of the organoborosiloxane to the phosphorous or metal atoms of the phosphorus or metal compound.

3. The process of claim 1 wherein the amount of the compound capable of forming a complex is the one at least required to form a complex with the phosphorus or metal compound.

4. The process of claim 1 wherein the heating temperature is from 200° C. to 500° C.

* * * * *